US008989817B2

(12) United States Patent
Wu et al.

(10) Patent No.: US 8,989,817 B2
(45) Date of Patent: Mar. 24, 2015

(54) METHODS AND APPARATUS FOR USING ANTENNAS WITH DIFFERENT POLARIZATION AND SIGNAL TRANSMIT POWERS

(75) Inventors: Xinzhou Wu, Monmouth Junction, NJ (US); Vikram Reddy Anreddy, Bridgewater, NJ (US); Junyi Li, Bedminster, NJ (US); Rajiv Laroia, Far Hills, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1536 days.

(21) Appl. No.: 12/043,821

(22) Filed: Mar. 6, 2008

(65) Prior Publication Data
US 2009/0227291 A1 Sep. 10, 2009

(51) Int. Cl.
*H04M 1/00* (2006.01)
*H04W 16/12* (2009.01)
*H04B 7/10* (2006.01)
*H04W 52/42* (2009.01)
*H04W 16/24* (2009.01)

(52) U.S. Cl.
CPC .............. *H04W 16/12* (2013.01); *H04B 7/10* (2013.01); *H04W 52/42* (2013.01); *H04W 16/24* (2013.01)
USPC ....... 455/562.1; 455/63.1; 455/450; 455/132; 455/13.3; 455/561; 455/82; 370/328; 370/338; 370/310; 375/267; 375/347; 375/148

(58) Field of Classification Search
CPC .. H04B 7/0617; H04B 7/0626; H04B 7/0413; H04B 7/0417; H04B 7/0478; H04B 7/0456; H04B 7/0634; H04B 7/0486; H04B 7/04; H04B 7/0404; H04B 7/0691; H04B 7/022; H04B 7/0608; H04B 7/0695; H04B 7/088; H04B 7/0891; H04W 16/28; H04W 88/08; H04W 16/14; H04W 52/42; H04W 52/16; H04W 52/146; H04W 52/325; H04W 28/048
USPC ............ 455/562.1, 561, 63.1, 450, 63.4, 132, 455/13.3, 82; 375/265, 260, 267, 347, 148; 343/798; 370/328, 338, 334, 310; 700/53

See application file for complete search history.

(56) References Cited

U.S. PATENT DOCUMENTS 5,513,525 A * 5/1996 Schurmann ................ 73/146.5
5,629,713 A * 5/1997 Mailandt et al. ............. 343/808

(Continued)

OTHER PUBLICATIONS

International Search Report and Written Opinion—PCT/US2009/036426, International Search Authority—European Patent Office—Jun. 17, 2009.

*Primary Examiner* — Fred Casca
(74) *Attorney, Agent, or Firm* — Michelle Gallardo

(57) ABSTRACT

Method and apparatus related to implementing and/or utilizing different polarization antennas with different corresponding average transmit power levels are described. Inter-cell interference is mitigated by having different cells with different power relationships between polarizations antennas. For example, a first base station transmits at a high average power level on its vertical polarization antenna and transmits at a low average power level on its horizontal polarization antenna. Concurrently, a second base station, which is adjacent to the first base station, transmits at a low average power level on its vertical polarization antenna and transmits at a high average power level on its horizontal polarization antenna. In some hexagonal deployment schemes a base station has at most two adjacent base stations using the same power level to antenna polarization direction relationship as it is using.

24 Claims, 7 Drawing Sheets

(56) References Cited

U.S. PATENT DOCUMENTS

| | | | |
|---|---|---|---|
| 5,822,698 A * | 10/1998 | Tang et al. | 455/447 |
| 6,067,055 A | 5/2000 | Vaidyanathan | |
| 6,078,815 A * | 6/2000 | Edwards | 455/450 |
| 2002/0164954 A1 * | 11/2002 | Jalali | 455/67.1 |
| 2004/0001450 A1 * | 1/2004 | He et al. | 370/286 |
| 2004/0121753 A1 * | 6/2004 | Sugar et al. | 455/333 |
| 2006/0281412 A1 * | 12/2006 | Skafidas et al. | 455/63.1 |

* cited by examiner

METHODS AND APPARATUS FOR USING ANTENNAS WITH DIFFERENT POLARIZATION AND SIGNAL TRANSMIT POWERS

FIELD

Various embodiments relate to wireless cellular networks, and more particularly to methods and apparatus related to using different polarization antennas associated with different transmit power levels.

BACKGROUND

In a wireless communications system, there is typically a fixed amount of bandwidth available for communications. As more and more individuals start to utilize wireless services and as service providers continue to offer new and varied wireless services, the demand and competition for those limited resources continues to increase. Therefore, there is a need for new and inventive methods and apparatus to boost system capacity.

In a multi cell cellular system, alot of approaches have been proposed to mitigate the inter-cell interference and boost system capacity. However there are problems associated with these proposed approaches. For example, spatial multiple input multiple output (MIMO) techniques need inter-element spacing which is a problem in ever shrinking mobile devices. Another problem with spatial MIMO techniques is that in a rank deficient scattering environment spatial MIMO does not prove to be very effective.

The interference between a vertically polarized antenna and a horizontally polarized antenna is typically very small as compared with interference resulting due to spatial antenna arrays. Two differently polarized antennas can create two parallel channels similar to two channels using different frequency bands. It would be beneficial if methods and apparatus were developed which exploited these attributes associated with using different polarized antennas.

In view of the above discussion, it would be desirable if improved methods and apparatus could be developed to mitigate the inter-cell interference and/or increase the system capacity.

SUMMARY

Methods and apparatus for using multiple antennas or multiple antenna elements having different polarization are described. Various exemplary embodiments are directed to methods and apparatus for deploying polarized antennas in a cellular network in a particular manner and transmitting using different powers levels on these polarized antennas. In one exemplar embodiment inter-cell interference is mitigated by using polarized antennas transmitting at different power levels. In some embodiments, at least one of the access nodes, e.g. base stations, and at least one of the wireless terminals, e.g., mobile nodes have at least one vertically polarized antenna and at least on horizontally polarized antenna. In some, but not necessarily all embodiments, each of the access nodes, e.g., base stations, and each of the wireless terminals, e.g., mobile nodes, have at least one vertically polarized antenna and at least one horizontally polarized antenna.

Different power levels are used on different polarizations for the same cell and/or same sector. In some, but not necessarily all embodiments, a base station of a cell may transmit at an average power $P_V$ on its vertically polarized antenna and transmit at an average power $P_H$ on its horizontally polarized antenna. The power levels $P_V$ and $P_H$ for the cell are different from each other. The cells of the communications system are deployed in such a way that in some cells, $P_V$ is greater than $P_N$, e.g. by at least 2 dBs, while in some other cells $P_V$ is less than $P_H$, e.g., by at least 2 dBs. In some such embodiments, the differences are at least 6 dBs.

The deployment of cells in the cellular network and allocation of power over different polarization antennas is done in such a manner, in some embodiments, that the number of direct neighboring cells using the same polarization is minimized. Wireless terminals, e.g., mobile nodes, operating in the boundary region between cells can benefit from this minimization, e.g., experiencing less interference on average from other cells. It should be appreciated that by employing this scheme, the inter-cell interference is greatly reduced and a boost in system capacity can be achieved without introducing too much additional overhead into a system.

An exemplary system, in accordance with various embodiments, includes a first base station, said first base station including: an antenna assembly including a first antenna having a first polarization and a second antenna having a second polarization, said first and second polarizations being different by at least 45 degrees; a first transmitter module coupled to the first antenna, said first transmitter module transmitting at a first average power level during a first period of time; and a second transmitter module coupled to the second antenna said second transmitter module transmitting at a second average power level during said first period of time, said second average power level differing from the first average power level by more than 2 dB. An exemplary communications method, in accordance with various embodiments, comprises: operating a first base station, wherein operating the first base station includes: transmitting a first signal at a first average power level from a first antenna having a polarization in a first direction, during a first period of time; and transmitting a second signal at a second average power level from a second antenna having a polarization in a second direction, during said first period of time: said first and second directions being different by at least 45 degrees: and wherein said second average power level differs from the first average power level by more than 2 dB.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION OF THE FIGURES

Figure 1:
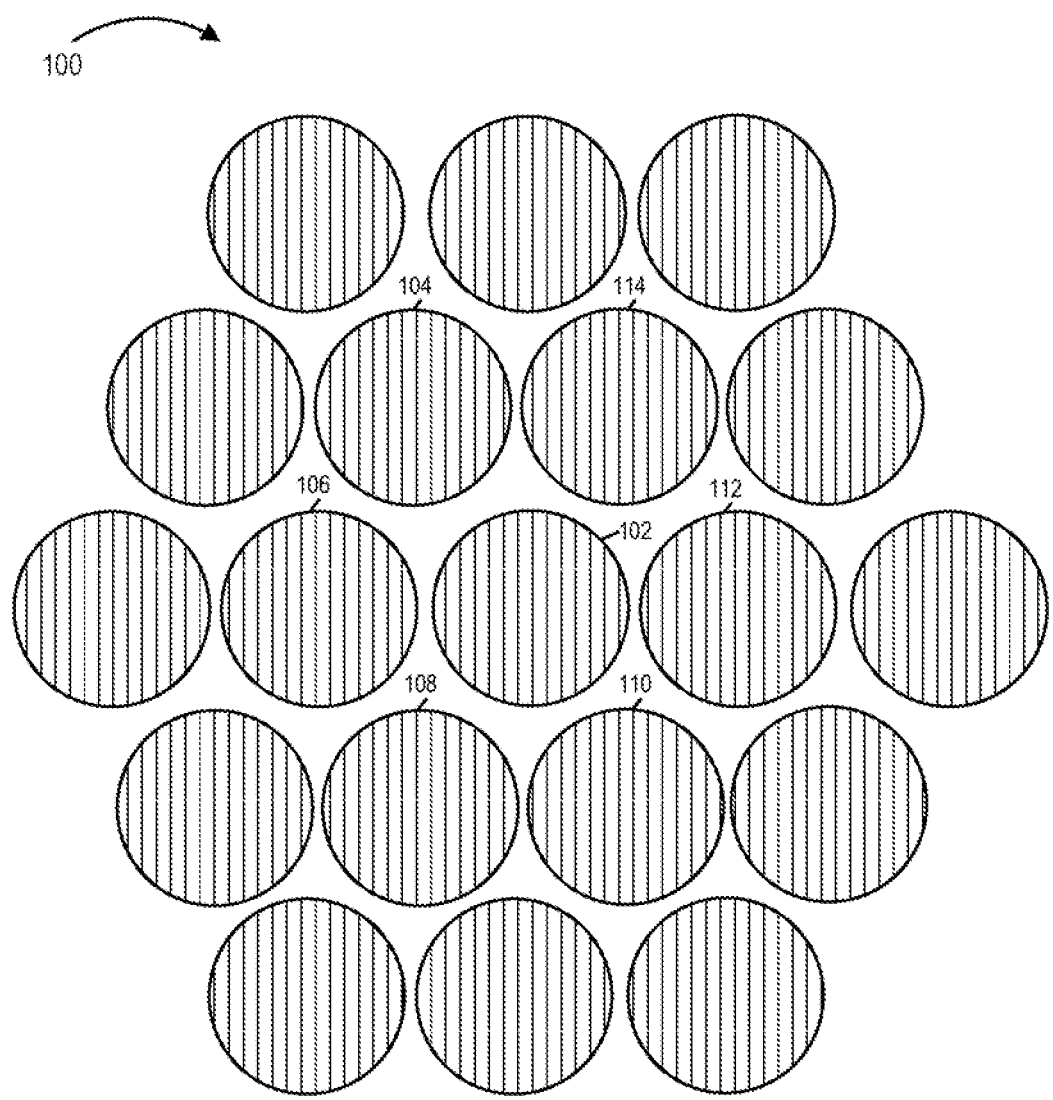
FIG. 1 illustrates a known cell deployment pattern using single polarization antennas.

FIG. 1 illustrates a cell deployment pattern 100 that is being used in existing communication systems. The same antenna polarization is used in adjacent cells and the cellular layout is referred to as a hexagonal deployment scheme. In this example, each cell's base station uses a single direction for transmit antenna polarization, e.g., vertical polarization. A cell is represented by a circle, e.g., cell 102, and vertical polarization is represented by vertical line shading. Although cells have been shown separately, for the purposes of illustration, it is to be understood that adjacent cellular coverage regions may, and generally do overlap.

In this scheme, a cell can have six direct interfering neighbors. Therefore a communications device, in such a cell, trying to recover signals from its base station can expect to experience interference from such interfering neighbors. For example, devices communicating with the base station of cell 102, e.g. receiving downlink signals from the base station of cell 102, can experience interference from one or more of adjacent cells 104, 106, 108, 110, 112, 114.

Figure 2:
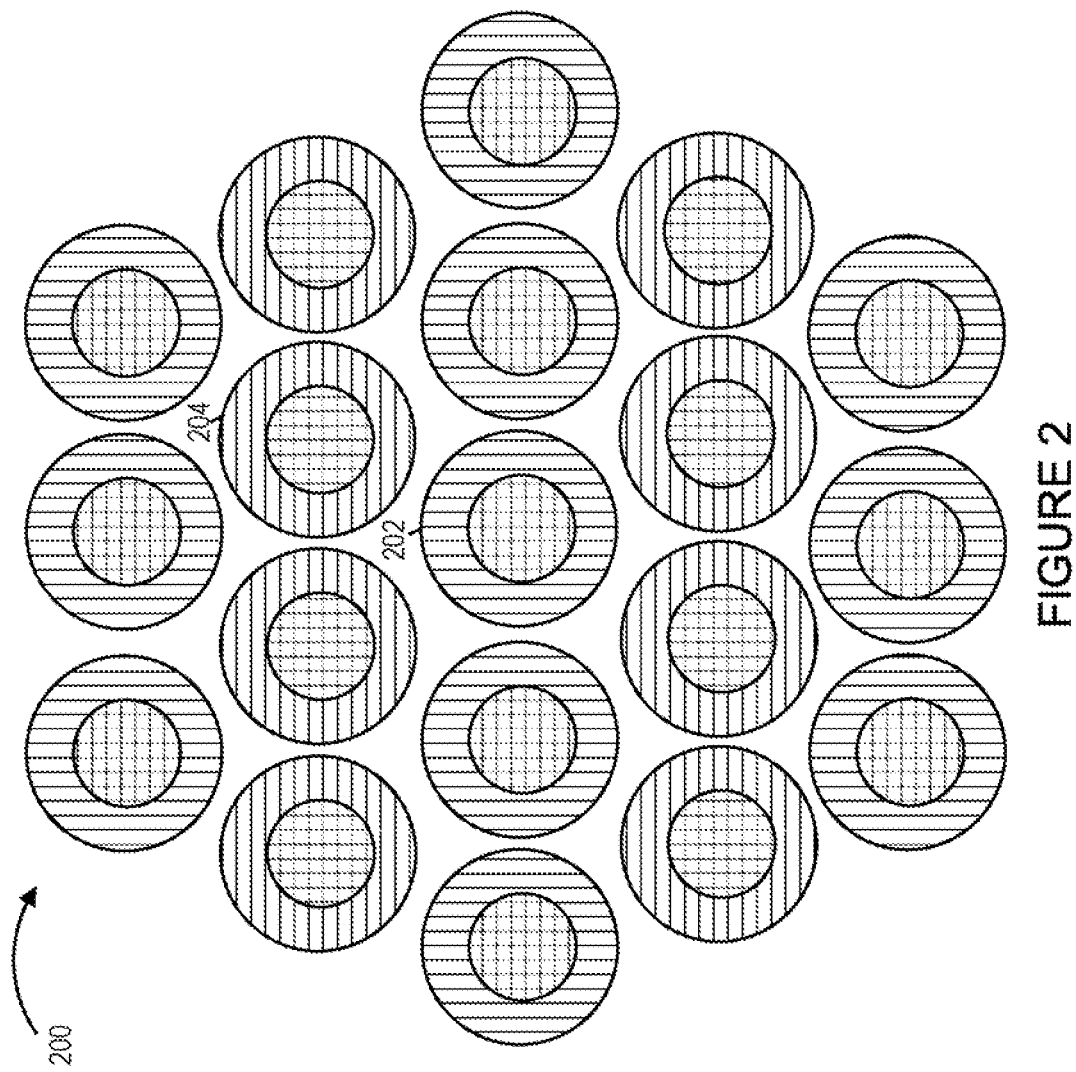
FIG. 2 illustrates a cell deployment pattern as implemented in accordance with one exemplary embodiment.

FIG. 2 illustrates an exemplary cell deployment pattern 200, implemented in accordance with one exemplary embodiment. In this cell deployment pattern hexagonal cell deployment is used. In addition, this deployment also uses different antenna polarizations and different power levels. More specifically, the cell deployment pattern 200 of FIG. 2 includes (i) a first type cell in which two different polarization antennas are used and different power levels are associated with the two different polarization antennas for the first type cell, and (ii) a second type cell in which two different polarization antennas are used and different power levels are associated with the two different polarization antennas for the second type cell. In this scheme, the idea of using different power levels on different polarizations has been exploited. In some embodiments, the different polarization antennas used are vertical and horizontal polarization antennas and power relationships between the two types of antennas are reversed in the two types of cells. For example, a first type of cell can use more power on the vertical direction and less power on the horizontal direction. For second type cells, they operate in an opposite way, i.e., they put more power on the horizontal direction and less power on the vertical direction. It should be appreciated that in the center part of a cell, each of the wireless terminals, e.g., mobiles, can be served by both base station antennas, while in the outer regions of the cell, the wireless terminal, e.g., mobile, will be served by a base station polarization antenna transmitting at a sufficient power level from the perspective of the wireless terminal. Thus in a first type of cell, the wireless terminal situated in the outer boundary region of the cell may be served by a base station vertical polarized antenna. However, in a second type of cell, the wireless terminal situated in the outer boundary region may be served by a base station horizontal polarized antenna. In the exemplary deployment scheme, the use the hexagonal cell deployment along with different power levels on different polarizations offers better interference management between neighboring cells by minimizing the number of interfering cells to a particular cell. FIG. 2 represents one embodiment as an example of allocating polarization power profiles to each cell in a hexagonal cellular network.

More specifically, as shown in FIG. 2, the exemplary cell 202 and exemplary cell 204 have been assigned different polarization power profiles. Cell 202 has been assigned higher power level on the vertical direction and less power on the horizontal direction. This has been represented in the Figure as follows. The outer circle of cell 202 indicates the higher power level and the vertical lines filling the outer circle represents that this higher transmit power is used on the vertical antenna polarization direction. The smaller circle within cell 202 is indicative of lower power and the horizontal lines filling the smaller circle are indicating that this lower transmit power is used on horizontal polarization antenna. In a similar way the outer circle of cell 204 represents the higher power level; however, this time, the higher power is on horizontal antenna polarization direction as indicated by the horizontal lines filling the larger outer circle. The smaller circle within cell 204 is indicative of a lower transmit power level associated with vertical polarization as indicated by the filling vertical lines.

It may be observed that in this exemplary deployment with regard to the outer boundary region of cell 202, there are two "interfering neighbors" also using high power in the vertical antenna direction, while there are four other "non-interfering neighbors" using high power in the horizontal direction. Similarly, it may be observed that in this exemplary deployment with regard to the outer boundary region of cell 204, there are two "interfering neighbors" also using high power in the horizontal antenna direction while there are four other "non-interfering neighbors" using high power in the vertical direction.

Figure 3:
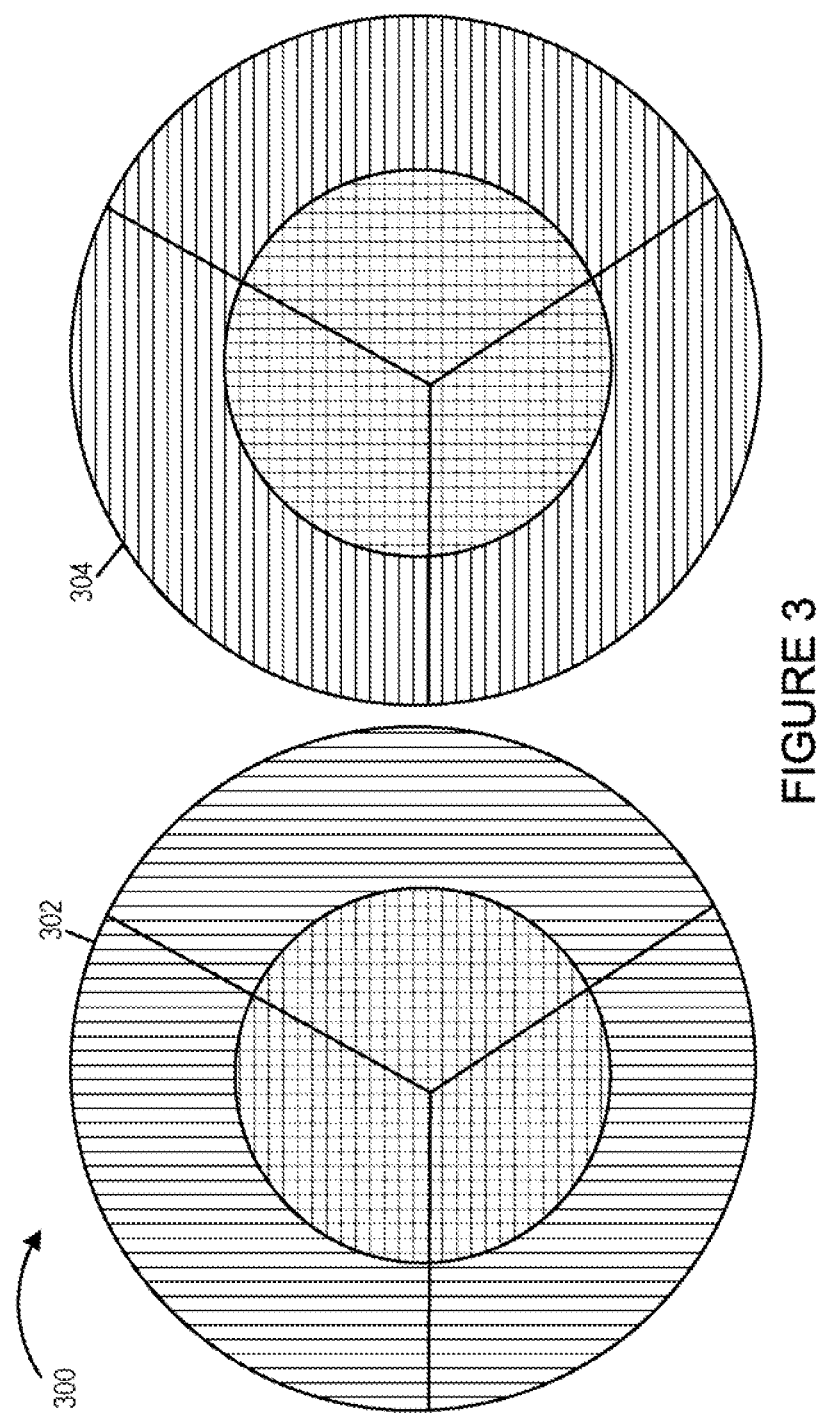
FIG. 3 illustrates deployment of two cells adjacent to each other in accordance with one exemplary embodiment.

FIG. 3 shows an exemplary deployment scheme 300, illustrating the deployment of two cells, i.e. cell 302 and cell 304, adjacent to each other. The figure represents one embodiment as an example of how to allocate polarization power profiles to adjacent multi-sector cells. The cells 302 and 304 have been assigned different power levels on different antenna polarization directions to take advantage of polarization reuse. Both the cells, i.e. cell 302 and cell 304 have been represented as 3 sector cells: however, the same concept can be extended to other multi sector cells as well, e.g., cells with two sectors and cells with more than 3 sectors. Cell 302 has been assigned higher power level on the vertical direction and less power on the horizontal direction. This has been represented in FIG. 3 as follows. The outer circle of cell 302 indicates higher power level and the vertical lines filling the outer circle represents that this higher power is on the vertical polarization direction. The smaller circle within cell 302 is indicative of lower power and the horizontal lines filling the smaller circle are indicating that this lower power is on horizontal polarization direction. In a similar way, considering the neighboring cell 304, the outer circle of cell 304 represents the higher power level, however, this time, the higher power is on horizontal polarization direction as indicated by the horizontal lines filling the larger outer circle. The smaller circle of cell 304 with vertical line shading indicates that in this cell the lower power level is used for the vertical polarization direction.

Figure 4:
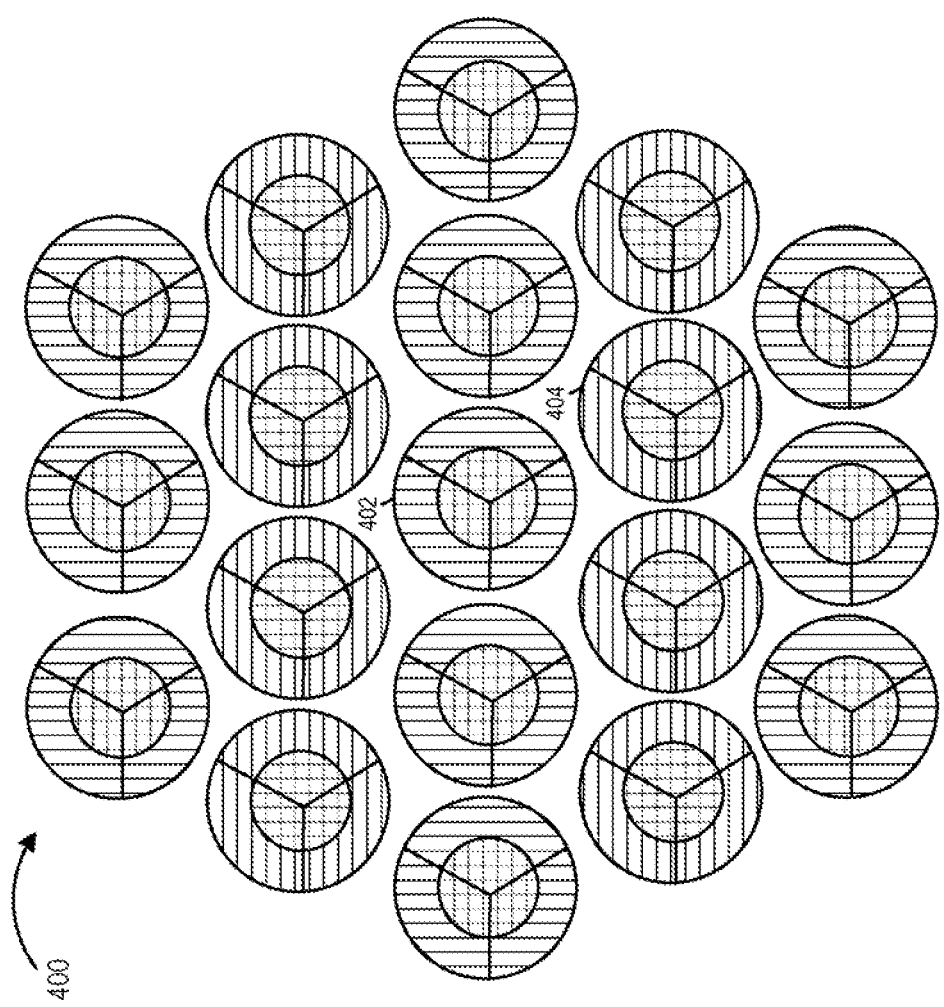
FIG. 4 illustrates an exemplary sectorized cell deployment pattern implemented in accordance with one exemplary embodiment.

FIG. 4 illustrates a cell deployment pattern 400, implemented in accordance with one exemplary embodiment. The deployment pattern 400 of FIG. 4 includes many features which are the same or similar to those previously described with reference to the exemplary embodiment shown in FIG. 2. In this cell deployment pattern, for a given cell there are two polarization directions with different power levels. In this deployment, there are two types of cells with different polarization direction to power level associations in the system, and hexagonal cell deployment has been implemented. Furthermore, sectorization has been performed on the cells to facilitate even better interference management between neighboring cells. For the sake of simplicity, only 3 sectors per each cell have been shown in FIG. 4; however, the same concept can be extended to other types of multi-sector cells as well, e.g., cells with two sectors and cells with more than 2 sectors. The multi-sector cells have been deployed in a hexagonal cell deployment pattern and as discussed earlier with reference to the exemplary embodiment shown in FIG. 2, and the cells have been allocated different polarization power profiles. Exemplary first type cell, cell 402, uses two different power levels, a different power level for each different direction of antenna polarization. The larger outer circle of cell 402 represents the higher power level for the cell and the vertical lines filling this outer circle indicate that the higher power corresponds to vertical polarization antenna transmissions. The smaller circle within the cell 402 represents the lower power level for the cell and the horizontal lines filling this smaller circle indicate that lower power corresponds to horizontal direction polarization antenna transmissions. Considering the exemplary second type cell 404, we can explain the allocation of polarization power profile in a similar manner. In cell 404, the larger outer cell represents the higher power level for the cell. However, this time, the higher power is used on horizontal polarization as indicated by the horizontal lines filling the larger outer circle. The smaller circle of cell 404 with vertical line filling indicates that for this cell, the lower power level corresponds to transmission on the vertical polarization antenna of the base station. Further sectorization within the cell serves to improve interference management within a cell as well as between neighboring cells.

Figure 5:
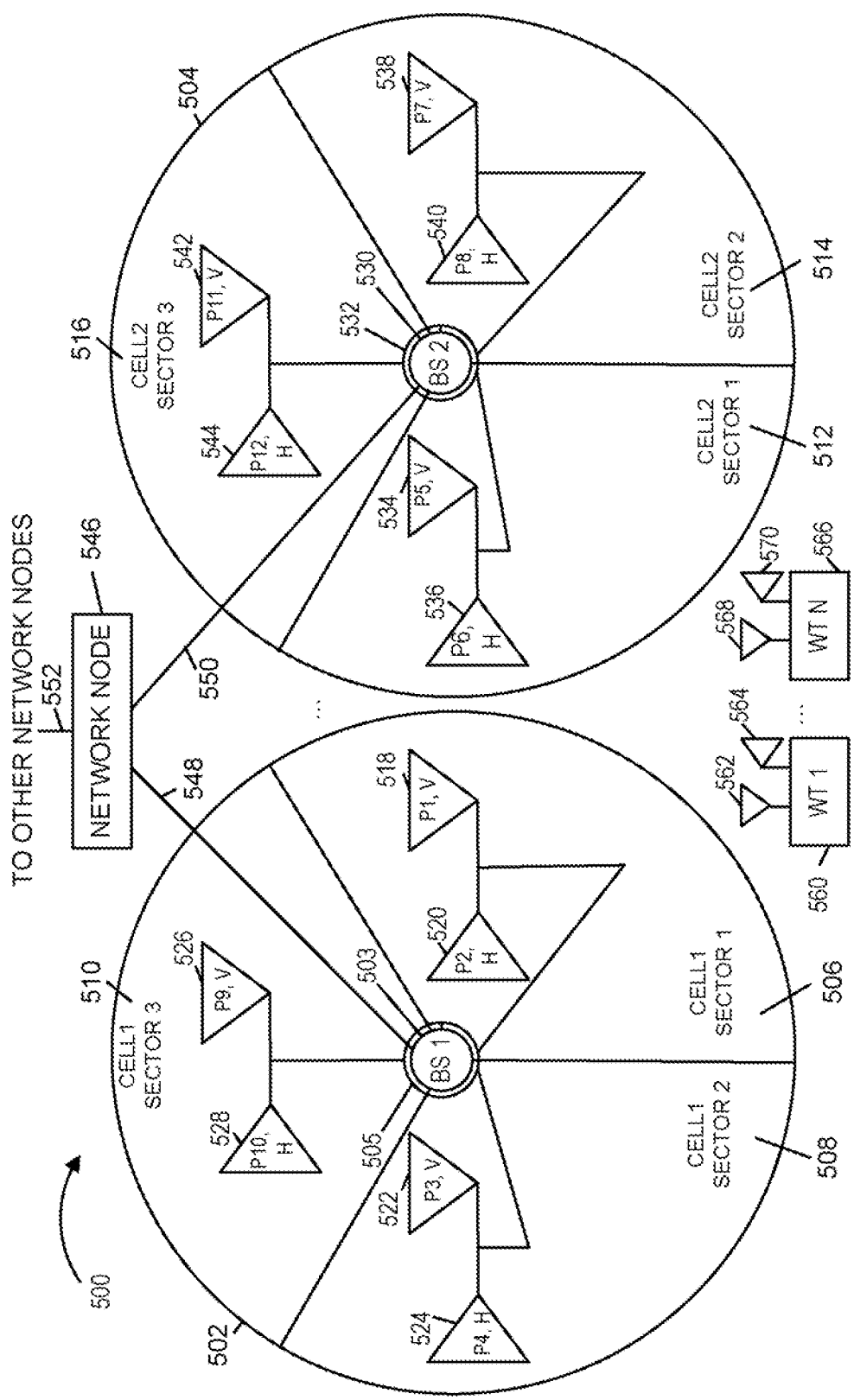
FIG. 5 illustrates deployment of two multi sector cells adjacent to each other in an exemplary communications system.

FIG. 5 illustrates an exemplary communications system 500 showing deployment of two multi sector cells adjacent to each other in accordance with one exemplary embodiment. The exemplary communications system 500 comprises a first cell 502 and a second cell 504. Each cell (502, 504) of exemplary system 500 includes three sectors ((506, 508, 510), (512, 514, 516)), respectively. Cell 502 includes a first base station 503 and a first antenna assembly 505. The first antenna assembly 505 includes a vertically polarized antenna 518 transmitting at first power level P1 in first sector 506, a horizontally polarized antenna 520 transmitting at a second power level P2 in first sector 506, a vertically polarized antenna 522 transmitting at a third power level P3 in second sector 508 a horizontally polarized antenna 524 transmitting at a fourth power level P4 in second sector 508, a vertically polarized antenna 526 transmitting a ninth power level P9 in third sector 510, and a horizontally polarized antenna 528 transmitting tenth power level P10 in third sector 510

The second cell 504 includes similar components as described for first cell 502. The second cell 504 includes a second base station 530 and a second antenna assembly 532. The second antenna assembly 532 includes a vertically polarized antenna 534 transmitting at a fifth power level P5 in first sector 512, a horizontally polarized antenna 536 transmitting at a sixth power level P6 in first sector 512, a vertically polarized antenna 538 transmitting seventh power level P7 in second sector 514, a horizontally polarized antenna 540 transmitting eighth power level P8 in second sector 514, a vertically polarized antenna 542 transmitting a eleventh power level P11 in third sector 516, and a horizontally polarized antenna 544 transmitting at a twelfth power level P12 in third sector 516.

The multi-sector communications system 500 also includes a network node 546 which is coupled to the first base station BS1 503, and second base station BS2 530 via network links 548, 550, respectively. Network node 546 is also coupled to other network nodes, e.g., other base stations, AAA server nodes, intermediate nodes, routers, etc. and the Internet via network link 552. Network links 548, 550 and 552 may be, e.g., fiber optic cables. In some embodiments, network node 546 is a system configuration control node which sends configuration information to the various base stations in the system, e.g., configuration information identifying which direction polarization antenna for a base station is to be associated with high transmission power and which direction polarization antenna for a base station is to be associated with a low level of transmission power and/or power level information corresponding to the different polarization antenna, e.g., absolute and/or relative power level information. Such communicated information can be, and sometimes is, used to establish and/or update the communications system to obtain a desired deployment pattern to manage interference and/or boost system capacity, e.g. a deployment pattern such as shown in FIG. 4. In some embodiments, the configuration information is loaded in a base station as part of a base station deployment and/or upgrade and need not necessarily be communicated via the backhaul network.

The individual cells 502 and 504 in the exemplary system 500, are deployed adjacent to each other. Two antennas are being used in each sector of each cell to transmit at different power levels on different polarization directions. For example, base station 1 503 is transmitting at a first average power level P1 from antenna 518, having a vertical polarization direction, and is transmitting at a second average power level P2 from antenna 520, having a horizontal polarization direction.

The first and second average power levels (P1, P2) are different from each other by more than 2 dBs. In a similar way, if we consider sector 2 508 of cell 502, base station 1 503 is transmitting at a third average power level P3 from antenna 522, having a vertical polarization direction, and is transmitting at a fourth average power level P4 from antenna 524, having a horizontal polarization direction. The third and the fourth average power levels are different from each other by more than 2 dB, and first and third average power level are within 1 dB of each other. Also, the second and fourth average power levels are within 1 dB of each other. Furthermore, the first, third and ninth average power levels are less than the second, fourth and tenth power levels. In one example, cell 502 of FIG. 5 represents cell 404 of FIG. 4.

Similarly, the base station 530 is transmitting from vertical polarization antennas (534, 438, 542) in the second cell 504, at (fifth, seventh and eleventh) power levels, respectively which are approximately same average power levels. For example, fifth, seventh and eleventh average power levels are within 1 dB of each other. The base station 530 is also transmitting from horizontal polarization antennas (536, 540, 544) in the second cell 504 at (sixth, eighth and twelfth) power levels, respectively, which are approximately the same average power levels. For example, sixth, eighth and twelfth average power levels are within 1 dB of each other. The fifth, seventh and eleventh power levels are greater than the sixth, eighth and twelfth power levels. In one example, cell 504 of FIG. 5 represents cell 402 of FIG. 4.

System 500 also includes a plurality of wireless terminals (WT 1 560, . . . , WT N 566), e.g., mobile nodes, sometimes also referred to as access terminals. WT 1 560 includes a vertical polarization antenna 562 and a horizontal polarization antenna 564. WT N 566 includes a vertical polarization antenna 568 and a horizontal polarization antenna 570. In some embodiments, at least some of the wireless terminals support concurrent communications links, e.g., a first link using a vertical polarization antenna receiving downlink signals from a base station vertical polarization antenna and a second link using a horizontal polarization antenna receiving downlink signals from a base station horizontal polarization antenna. The base station vertical polarization antenna and the base station horizontal polarization antenna may be from the same base station or from different base stations. In the case where the base station horizontal polarization antenna and base station vertical polarization antenna are from the same base station, they may correspond to the same or different sectors. In some embodiments, a first link between the wireless terminal and a base station using a horizontal polarization antennas serves as a first pipe, e.g., for a first data stream, and the second link between the wireless terminal and a base station using vertical polarization antennas serves as a second pipe, e.g., for a second data stream.

Figure 6:
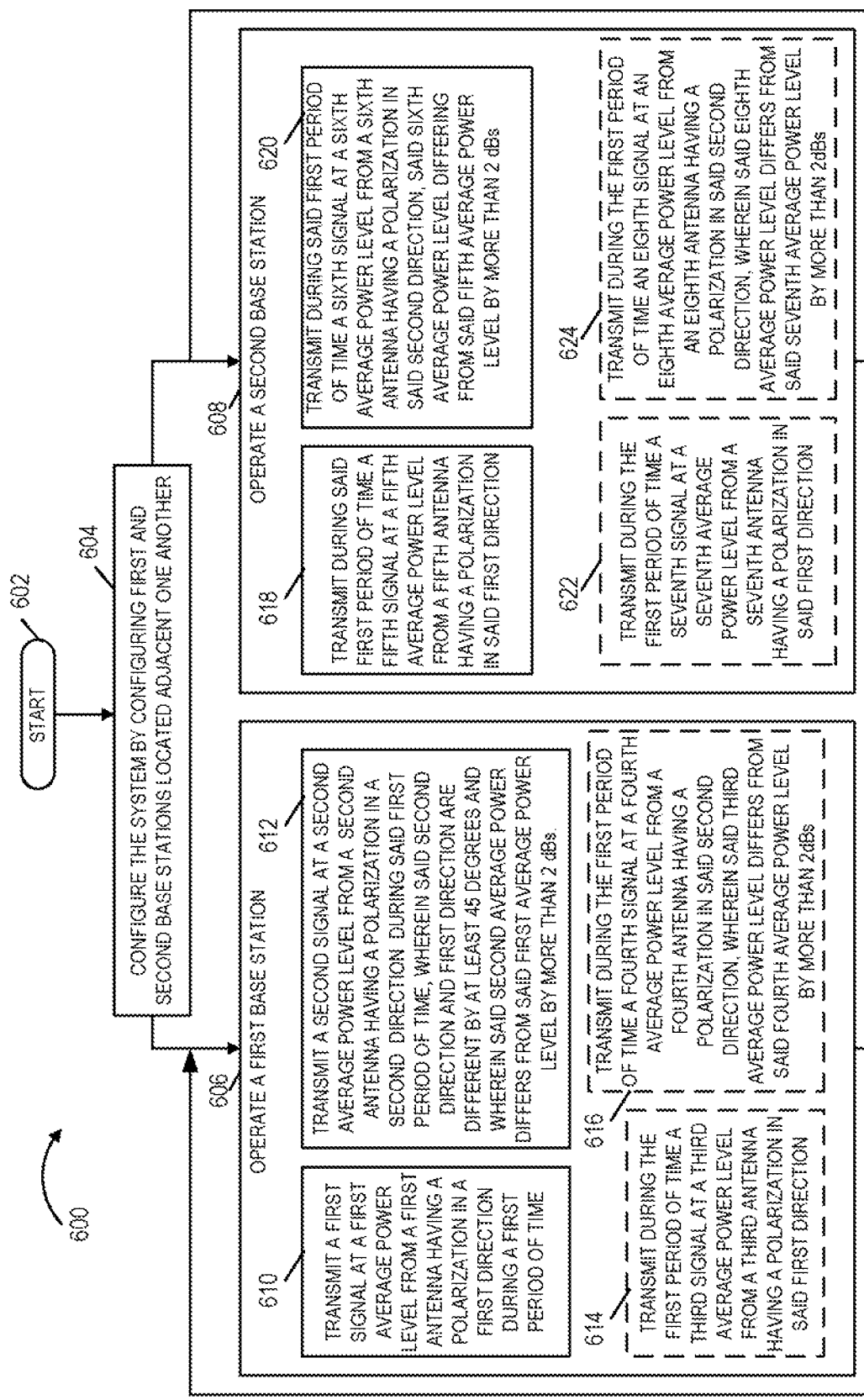
FIG. 6 illustrates a flowchart showing the steps of an exemplary method to configure a system and operate first and second base stations in accordance with an embodiment.

FIG. 6 illustrates a flowchart 600 showing the steps of an exemplary method to configure a system and operate first and second base stations, included within the system, to transmit signals using different polarization antennas with different transmit power levels associated with a pair of different polarization antennas for a sector of a given cell. The exemplary method starts in step 602, where the base stations are powered up and initialization is performed. Operation proceeds from start step 602 to step 604. In step 604, the system including first and second base stations is configured by configuring first and second base stations, which are located adjacent to each other. In some embodiments, the first and second base stations are multi-sector base stations and configuring the first and second base station includes configuring with regard to a first sector of the first base station and configuring with regard to a first sector of the second base station, wherein the first sector of the first base is located physically adjacent the first sector of the second base station. In some embodiments, the configuring of step 604 includes for the first base station loading and/or retrieving information identifying and/or communicating average power levels associated with different polarization antennas for the first base station. In some embodiments, the configuring of step 604 includes for the second base station loading and/or retrieving information identifying and/or communicating average power levels associated with different polarization antennas for the second base station. In some embodiments, for a system control node, the configuring of step 604 includes downloading information identifying and/or communicating average power levels associated with different polarization antennas to the first and second base stations, e.g., in accordance with a scheme such as illustrated in FIG. 2, FIG. 4 or FIG. 5. In some embodiments, the configuration of first and second base stations is performed during base station set-up or base station reconfiguration as part of a system upgrade. In some embodiments, configuration of a base station is performed on the base station, with the configuration selected for a base station being a function of planned and/or implemented configuration information corresponding to an adjacent base station. This coordinated configuration of adjacent base stations is used to limit interference, e.g., achieving a desired pattern of high/low power associations with antenna polarizations in the system. For example, in one exemplary embodiment, a base station in a hexagonal system layout is configured such that two adjacent base stations use a similar power/antenna polarization configuration, while four adjacent base stations use a different power/antenna polarization configuration. The operation proceeds from steps 604 to steps 606 and 608, which are performed in parallel.

In step 606 the first base station is operated, wherein first base station operations include generating and transmitting signals. Step 606 includes sub-steps 610 and 612. In some embodiments, e.g., some embodiments in which the first base station is a multi-sector base station, step 606 includes sub-steps 614 and 616

In sub-step 610, the first base station is operated to transmit a first signal at a first average power level from a first antenna having a polarization in a first direction during a first period of time, in sub-step 612, the first base station is operated to transmit a second signal at a second average power level from a second antenna having a polarization in a second direction during said first period of time, wherein said second direction and the first direction are different by at least 45 degrees and wherein the second average power differs from the first average power by more than 2 dBs. In various embodiments, the first direction is a vertical direction and the second direction is a horizontal direction. In some embodiments, the steps of transmitting a first signal and a second signal are performed at the same time. In some embodiments, the first and second antennas correspond to a first sector of the first base station.

In sub-step 614, the first base station is operated to transmit during the first period of time a third signal at a third average power level from a third antenna having a polarization in the first direction. In various embodiments the first and third average powers are within 1 dB of each other. In some embodiments, the first period of time is a one day period of time. In sub-step 616, the first base station is operated to transmit during the first period of time a fourth signal from a fourth antenna at a fourth average power level having a polarization in the second direction, wherein said third average power levels differs from the fourth average power level by more than 2 dBs.

In step 608 the second base station is operated, wherein second base station operations include generating and transmitting signals. Step 608 includes sub-steps 618 and 620. In some embodiments, e.g., some embodiments in which the second base station is a multi-sector base station, step 608 includes sub-steps 622 and 624.

In sub-step 618, the second base station is operated to transmit during said first period of time a fifth signal at a fifth average power level from a fifth antenna having a polarization in the first direction. In sub-step 620, the second base station is operated to transmit during the first period of time a sixth signal at a sixth average power level from a sixth antenna having a polarization in the second direction said sixth average power level differing from the fifth average power level by more than 2 dBs. In some embodiments, the first average power is less than the second average power and the filth average power is larger than the sixth average power.

In some embodiments, the first and second antennas correspond to a first sector of the first base station and the fifth and sixth antennas correspond to a first sector of a second base station. In some such embodiments, the first sector of the first base station is located physically adjacent to the first sector of the second base.

In sub-step 622, the second base station is operated to transmit during the first period of time a seventh signal at a seventh average power level from a seventh antenna having a polarization in the first direction. In sub-step 624, the second base station is operated to transmit during the first period of time at an eight power level from an eighth antenna having a polarization in said second direction, wherein said eighth average power level differs from the seventh average power level by more than 2 dBs.

Operation proceeds from the output of step 606 to the input of step 606. Similarly operation proceeds from the output of step 608 back to the input of step 608. An additional iteration of step 606 and step 608 is performed in parallel.

In one exemplary embodiment, which implements a method in accordance with flowchart 600, the first base station is base station 1 503, the second base station is base station 2 530, the first direction is the vertical polarization direction, the second direction is the horizontal polarization direction, the first antenna is antenna 518, the second antenna is antenna 520, the first sector of the first base station is cell 1 sector 1 506, the third antenna is antenna 522, the fourth antenna is antenna 524, the fifth antenna is antenna 534, the sixth antenna is antenna 536, the first sector of the second base station is cell 2 sector 1 512.

Thus in this example, the adjacent sectors, cell 1 sector 1 506 and cell 2 sector 1 512 are controlled to have different average transmit powers on different polarization antennas to reduce interference, e.g., in the boundary region between cells.

An embodiment of flowchart 600 in which sub-steps 610, 612, 618 and 620 are performed, but sub-steps 614, 616, 622 and 624 are not performed may correspond to an embodiment using single sector base stations, e.g., representing two adjacent base stations such as those for cell 204 and 202 of FIG. 2.

FIGS. 3, 4 and 5 have described 3 sector base stations for which the method of flowchart 600 man apply and in which sub-steps 610, 612, 614, 616, 618, 620, 622 and 624 may be performed. The concepts are also relevant and used in some embodiments of multi-sector base station with different numbers of sectors, e.g., two sectors or more than three sectors per cell. In some multi-sector base stations, for a given base station, the average transmit power level for the first direction polarization antenna for any two adjacent sectors of the base station is substantially the same, e.g., within 1 dB of each other. In some multi-sector base stations, for a given base station, the average power level difference between first and second direction polarization antennas for any given sector is at least 2 dBs.

Figure 7:
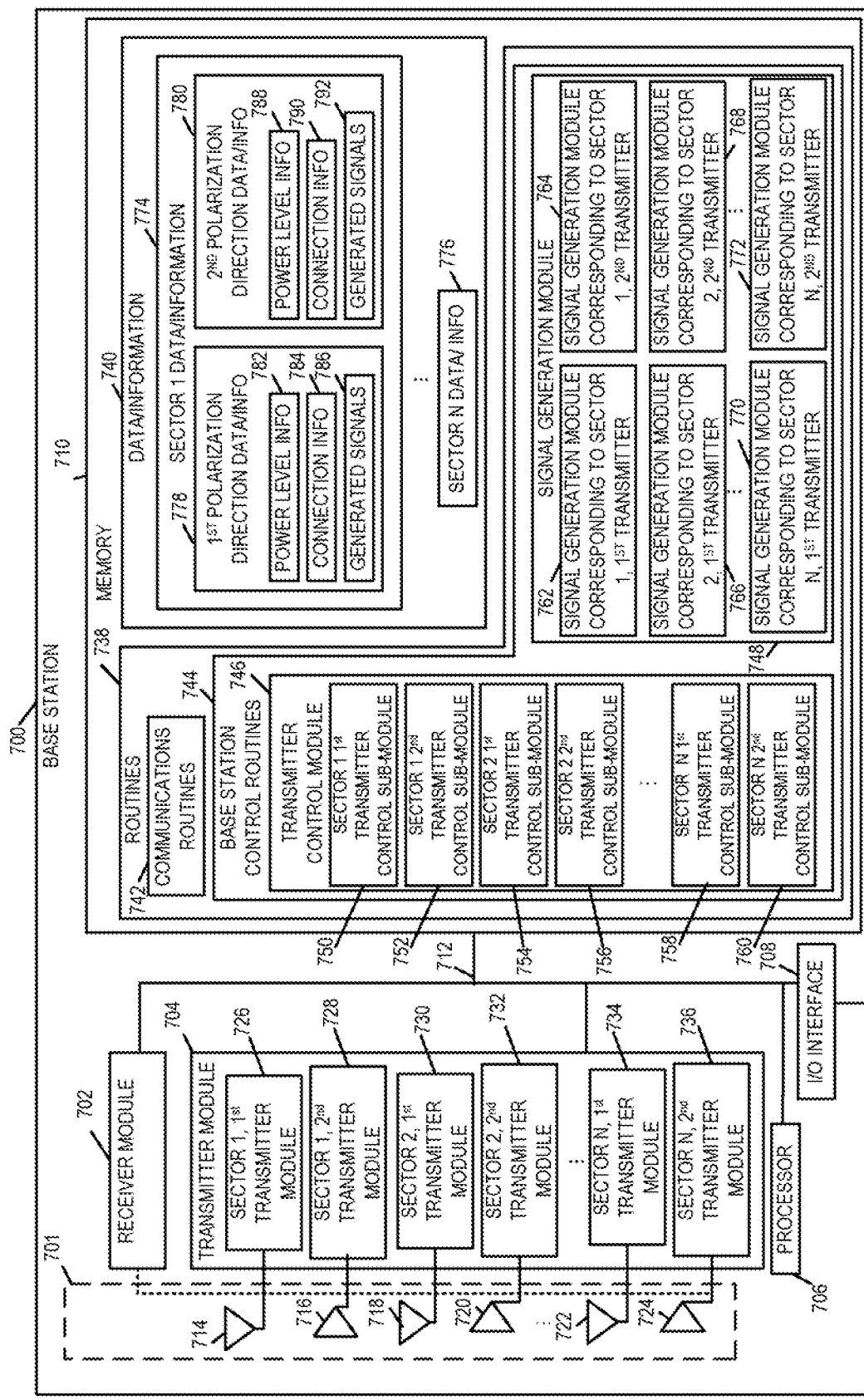
FIG. 7 illustrates an exemplary base station which may be used in the cells shown in FIG. 5.

FIG. 7 illustrates an exemplary base station 700 implemented in accordance with one embodiment. Base station 700 is, e.g., one of the base stations (503, 530) of exemplary communications system 500 of FIG. 5. Exemplary base station 700 includes a receiver module 702, a transmitter module 704, a processor 706, an I/O interface 708 and memory 710 coupled together via a bus 712 over which the various elements max interchange data and information. Exemplary base station 700 also includes an antenna assembly 701 coupled to receiver module 702 and transmitter module 704. In various embodiments a duplexer module is used to allow the same antenna to be used by a transmitter and receiver module.

Transmitter module 704 includes, in this embodiment, two transmitter modules per sector, corresponding to two different antenna polarization directions. Antenna assembly 701, e.g. antenna assembly 505 of base station 503 or antenna assembly 532 of base station 530 of FIG. 5, includes a plurality of antennas corresponding to different transmitter modules. More specifically, for a first sector, vertical polarization direction antenna 714 is coupled to sector 1 $1^{st}$ transmitter module 726 and horizontal polarization direction antenna 716 is coupled to sector 1 $2^{nd}$ transmitter module 728. For a second sector, vertical polarization direction antenna 718 is coupled to sector 2 $1^{st}$ transmitter module 730 and horizontal polarization direction antenna. 720 is coupled to sector 2 $2^{nd}$ transmitter module 732. For an Nth sector, vertical polarization direction antenna 722 is coupled to sector N $1^{st}$ transmitter module 734 and horizontal polarization direction antenna 736 is coupled to sector N $2^{nd}$ transmitter module 736. In one embodiment, where base station 700 is base station 503 of FIG. 5 and antenna assembly 701 is antenna assembly 505 of FIG. 5, antennas (714, 716, 718, 720, 722, 724) of FIG. 7 are antennas (518, 520, 522, 524, 526, 528), respectively of FIG. 5.

I/O interface 708 couples the base station 700 to the Internet and/or other network nodes, e.g., other base stations, routes, home agent nodes, AAA nodes, system control nodes used for providing configuration information, etc. I/O interface 708, by coupling the base station 700 to a backhaul network, allows a wireless terminal using a base station attachment point of base station 700 to participate in communications session with another wireless terminal using an attachment point of a different base station. I/O interface 700 also facilitates the configuration of base station 700 by a remote device, e.g., a system control node, and/or the coordination of configuration information corresponding to multiple base stations in a system, e.g., to achieve a desired pattern of transmit power/antenna polarization in the cells to reduce and/or minimize interference between adjacent cells.

Memory 710 includes routines 738 and data/information 740. The processor 706, e.g., a CPU, executes the routines 738 and uses the data/information 740 in memory 710 to control the operation of the base station 700 and implement methods, e.g., the method of flowchart 600 of FIG. 6.

Routines 738 include a communications routine 742 and base station control routines 744. The communications routine 742 implements the various communications protocols used by the base station 700. The base station control routines 744 include a transmitter control module 746 and a signal generation module 748. The transmitter control module 746 includes a plurality of sector sub-modules corresponding to the different transmitter module (sector 1 $1^{st}$ transmitter control sub-module 750, sector 1 $2^{nd}$ transmitter control sub-module 752, sector 2 $1^{st}$ transmitter control sub-module 754, sector 2 $2^{nd}$ transmitter control sub-module 756 . . . , sector N $1^{st}$ transmitter control sub-module 758, sector N $2^{nd}$ transmitter control sub-module 760) corresponding to transmitter modules (726, 728, 730, 732, . . . , 734, 736), respectively.

Signal generation module 748 includes a plurality of signal generation sub-modules corresponding to various transmitter modules (signal generation module corresponding to sector 1 $1^{st}$ transmitter 762, signal generation module corresponding to sector 1 $2^{nd}$ a transmitter 764, signal generation module corresponding to sector 2 $1^{st}$ transmitter 766, signal generation module corresponding to sector 2 $2^{nd}$ transmitter 768, signal generation module corresponding to sector N $1^{st}$ transmitter 770, signal generation module corresponding to sector N $2^{nd}$ a transmitter 772.

Data/information 740 includes a plurality of sets of data/information corresponding to the different sectors of the base station 700 (sector 1 data/information 774, . . . , sector N data/information 776). Sector 1 data/information 774 includes $1^{st}$ polarization data/information 778 and second polarization direction information 780. $1^{st}$ polarization direction data/information 778 includes power level information 782, connection information 784, and generated signals 786. $2^{nd}$ polarization data/information 780 includes power level information 788, connection information 790 and generated signals 792. The first polarization direction is, e.g., the vertical polarization direction of antennas (714, 718, . . . , 722) while the second polarization direction is, e.g., the horizontal polarization direction of antennas (716, 720, . . . , 724).

Power level information 782 includes information specifying an average reference power level used for transmitting via antenna 714 using sector 1 $1^{st}$ transmitter module 726 under the control of sector 1 $1^{st}$ transmitter control sub-module 750. Connection information 784 includes information identifying a wireless terminal or wireless terminal and/or a wireless terminal user or users which are to receive generated signals transmitted via antenna 714. Connection information 784 also includes information identifying air link resources, e.g., segments such as downlink traffic channel segments assigned to a user which are to receive downlink signals via antenna 714. Generated signals 786 include signals output from signal generation module 762 which are transmitted via antenna 714

Power level information 788 includes information specifying an average reference power level used for transmitting via antenna 716 using sector 1 $2^{nd}$ transmitter module 728 under the control of sector 1 $2^{nd}$ transmitter control sub-module 752. Connection information 790 includes information identifying a wireless terminal or wireless terminal and/or a wireless terminal user or users which are to receive generated signals transmitted via antenna 716. Connection information 790 also includes information identifying air link resources, e.g., segments such as downlink traffic channel segments assigned to a user which are to receive downlink signals via antenna 716. Generated signals 792 include signals output from signal generation module 764 which are transmitted via antenna 716.

In various embodiments, power level information 782 and power level information 788 include information identifying that there is an average transmit power difference of at least 2 dBs between transmitted signals corresponding to the vertical and horizontal polarization antennas for the first sector. In various embodiments, power information corresponding to different sectors but with same polarization is such that the average transmit power between any two adjacent sectors is substantially the same for the same polarization, e.g., within 1 dB of each other.

Antenna assembly 701 of base station 700 includes antenna 714 which has a first polarization and antenna 716 which has a second polarization, and the first and second polarizations are different by at least 45 degrees. In this example, the first polarization is a polarization in a first direction, and the first direction is a vertical direction: while the second polarization direction is a polarization in a second direction which is a horizontal direction.

Sector 1 $1^{st}$ transmitter module 726, which is coupled to antenna 714, which has a first polarization, transmits at a first average power level during a first period of time. The sector 1 $1^{st}$ transmitter control sub-module 750 controls transmitter module 726 to transmit at the first average power level, which is specified in or determined from power level information 782. Sector 1 $2^{nd}$ transmitter module 728, which is coupled to antenna 716, which has a second polarization, transmits at a second average power level during the first period of time, the second average power level differing from the first average power level by more than 2 dBs. The sector 1 $2^{nd}$ transmitter control sub-module 752 controls transmitter module 728 to transmit at the second average power level, which is specified in or determined from power level information 788. In some embodiments, during some times, the first and second transmitters (726, 728), using first and second antennas (714, 716), respectively, are used to transmit to a wireless terminal at the same time, e.g., communications two distinct data streams. In some embodiments, during some times, the first transmitter uses the first antenna to transmit to a first wireless terminal at the same time that the second transmit uses the second antenna to transmit to a second wireless terminal.

Sector 2 $1^{st}$ transmitter module 730, which is coupled to antenna 718, which has a first polarization, transmits at a third average power level during the first period of time. The sector 2 $1^{st}$ transmitter control sub-module 754 controls transmitter module 730 to transmit at the third average power level, which is specified in or determined from stored power level information corresponding to the $1^{st}$ polarization direction and sector 2. Sector 2 $2^{nd}$ transmitter module 732, which is coupled to antenna 720, which has a second polarization, transmits at a fourth average power level during the first period of time, the fourth average power level differing from the first average power level by more than 2 dBs. The sector 2 $2^{nd}$ transmitter control sub-module 756 controls transmitter module 732 to transmit at the fourth average power level, which is specified in or determined from stored power level information corresponding to sector 2 and the second polarization direction.

Sector N $1^{st}$ transmitter module 734, which is coupled to antenna 722, which has a first polarization, transmits at an (2N+1)th, average power level during the first period of time. The sector N $1^{st}$ transmitter control sub-module 758 controls transmitter module 734 to transmit at the (2N+1)th, average power level, which is specified in or determined from stored power level information corresponding to the $1^{st}$ polarization direction and sector N. Sector N $2^{nd}$ transmitter module 736, which is coupled to antenna 724, which has a second polarization, transmits at a (2N+2)th, average power level during the first period of time, the (2N+2)th, average power level differing from the (2N+1)th, average power level by more than 2 dBs. The sector N $2^{nd}$ transmitter control sub-module 760 controls transmitter module 736 to transmit at the (2N+2) average power level, which as specified in or determined from stored power level information corresponding to sector N and the second polarization direction.

In various embodiments, the second average power differs from the first average power by more than 2 dBs. In some such embodiments, first and third average powers are within 1 dB of each other. In some such embodiments, the first period of time is a one day period of time.

In various embodiments, base station 700 is intentionally located adjacent to another base station, which is similar to base station 700, but has different power relationships between its polarization directions. This coordination between adjacent base stations, regarding power information and polarization directions is used to limit interference and/or increase capacity. For example, consider that in base station 700 for each sector the vertical polarization direction average transmission power level is less than the horizontal polarization direction average transmission power level by at least 2 dBs. In the adjacent base station, the roles may be reversed such that the horizontal polarization direction average transmission power level is less than the vertical polarization direction average transmission power level by at least 2 dBs. Thus physically adjacent sectors of adjacent cells may have complementary power relationships.

While some embodiments are described as having the transmission power for similar polarizations from different transmitter modules of the same base station being within 1 dB of each other, in some but not necessarily all embodiments, a greater variation in transmit power levels is used.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g. method of controlling and/or operating mobile nodes, base stations and/or communications systems, e.g. hosts. Various embodiments are also directed to machine, e.g., computer, readable medium, e.g., ROM, RAM, CDs, hard discs, etc., which include machine readable instructions for controlling a machine to implement one or more steps of a method.

In various embodiments nodes described herein are implemented using one or more modules to perform the steps corresponding to one or more methods, for example, configuring at a controlled power level, transmitting using a first polarization antenna at a first average power level, transmitting using a second polarization antenna at a second average power level, signal generation, signal processing, message generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods of the invention.

In some embodiments, the processor or processors, e.g., CPUs, of one or more devices, e.g., communications devices such as base stations are configured to perform the steps of the methods described as being as being performed. Accordingly, some, but not all embodiments are directed to a device, e.g., communications device, with a processor which includes a module corresponding to each of the steps of the various described methods performed by the device in which the processor is included. In some but not all embodiments a device, e.g. a communications device, includes a module corresponding to each of the steps of the various described methods performed by the device in which the processor is included. The modules may be implemented using software and/or hardware.

While described in the context of an OFDM system, at least some of the methods and apparatus of various embodiments, are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines for implementing the methods.

The invention claimed is:

1. A system comprising:
a first base station, said first base station including an antenna assembly including a first antenna having a first polarization and a second antenna having a second polarization, said first and second polarizations being different by at least 45 degrees;
a first transmitter module coupled to the first antenna, said first transmitter module transmitting at a first average power level during a first period of time; and
a second transmitter module coupled to the second antenna, said second transmitter module transmitting at a second average power level during said first period of time, said second average power level being lower than the first average power level by more than 2 dB, wherein the first antenna and the second antenna provide service to a first sector,
wherein an adjacent base station adjacent to the first base station transmits the second polarization at a higher average power level than the adjacent base station transmits the first polarization,
wherein the first and second transmitter modules, using the first and second antennas, respectively, are configured to transmit to a wireless terminal at the same time.

2. The system of claim 1,
wherein said first polarization is a polarization in a first direction,
wherein said second polarization is a polarization in a second direction,
wherein said first direction is a vertical direction, and
wherein said second direction is a horizontal direction.

3. The system of claim 1, wherein said first transmitter module using said first antenna transmits to a first wireless terminal at the same time as said second transmitter module using said second antenna transmits to a second wireless terminal.

4. The system of claim 1, wherein the first and second antennas correspond to the first sector of said first base station, the antenna assembly of the first base station further comprising:
a third antenna having said first polarization and a fourth antenna having the second polarization,
a third transmitter module coupled to the third antenna, said third transmitter module transmitting at a third average power level during said first period of time; and
a fourth transmitter module coupled to the fourth antenna, said fourth transmitter module transmitting at a fourth average power level during said first period of time, said third average power level differing from the fourth average power level by more than 2 dB.

5. The system of claim 4, wherein the first and third average power levels are within 1 dB of each other and wherein said first period of time is a one day period of time.

6. The system of claim 4, wherein said third and fourth antennas correspond to a second sector of said first base station.

7. The system of claim 1, further comprising:
a second base station, said second base station including a second antenna assembly including a fifth antenna having said first polarization and a sixth antenna having said second polarization;
a fifth transmitter module coupled to the fifth antenna, said fifth transmitter module transmitting at a fifth average power level during said first period of time; and
a sixth transmitter module coupled to the sixth antenna, said sixth transmitter module transmitting at a sixth average power level during said first period of time, said sixth average power level differing from the fifth average power level by more than 2 dB.

8. The system of claim 7,
wherein the first average power level is less than the second average power level; and
wherein the fifth average power level is larger than the sixth average power level.

9. The system of claim 8,
wherein the first and second antennas correspond to the first sector of the first base station; and wherein the fifth and sixth antennas correspond to a first sector of a second base station, the first sector of the first base station being physically adjacent to the first sector of the second base station.

10. A communications method comprising:
operating a first base station, wherein operating the first base station includes:
transmitting a first signal at a first average power level from a first antenna having a polarization in a first direction, during a first period of time; and
transmitting a second signal at a second average power level from a second antenna having a polarization in a second direction, during said first period of time,
wherein said first and second directions are different by at least 45 degrees;
wherein said second average power level is lower than the first average power level by more than 2 dB; and
wherein the first antenna and the second antenna provide service to a first sector,
wherein an adjacent base station adjacent to the first base station transmits the polarization in the second direction at a higher average power level than the adjacent base station transmits the first polarization in the first direction,
wherein transmitting the first signal and the second signal are performed at the same time.

11. The method of claim 10, wherein said first direction is a vertical direction and said second direction is a horizontal direction.

12. The method of claim 10, wherein the first and second antennas correspond to the first sector of said first base station.

13. The method of claim 12, wherein operating the first base station further comprises:
transmitting, during said first period of time, a third signal at a third average power level from a third antenna having a polarization in said first direction; and
transmitting, during said first period of time, a fourth signal at a fourth average power level from a fourth antenna having a polarization in said second direction; and
wherein said third average power level differs from the fourth average power level by more than 2 dB.

14. The method of claim 13, wherein the first and third average power levels are within 1 dB of each other and wherein said first period of time is a one day period of time.

15. The communications method of claim 10, further comprising:
operating a second base station, wherein operating the said second base station includes:
transmitting, during said first period of time, a fifth signal at a fifth average power level from a fifth antenna having a polarization in said first direction; and
transmitting, during said first period of time, a sixth signal at a sixth average power level from a sixth antenna having a polarization in said second direction,
wherein said sixth average power level differs from the fifth average power level by more than 2 dB.

16. The method of claim 15,
wherein the first average power level is less than the second average power level; and
wherein the fifth average power level is larger than the sixth average power level.

17. The method of claim 16,
wherein the first and second antennas correspond to the first sector of the first base station; and
wherein the fifth and sixth antennas correspond to a first sector of a second base station.

18. The communications method of claim 17, further comprising:
configuring said first base station and said second base stations,
wherein the first sector of the first base station is located physically adjacent the first sector of said second base station.

19. A system comprising:
a first base station, said first base station including antenna assembly means including first antenna means having a first polarization and second antenna means having a second polarization, said first and second polarizations being different by at least 45 degrees;
first transmitter means coupled to the first antenna means, said first transmitter means transmitting at a first average power level during a first period of time; and
second transmitter means coupled to the second antenna means, said second transmitter means transmitting at a second average power level during said first period of time, said second average power level being lower than the first average power level by more than 2 dB, wherein the first antenna means and the second antenna means provide service to a first sector,
wherein an adjacent base station adjacent to the first base station transmits the second polarization at a higher average power level than the adjacent base station transmits the first polarization,
wherein said first and second transmitter means, using said first and second antenna means, respectively, are configured to transmit to a wireless terminal at the same time.

20. The system of claim 19,
wherein said first polarization is a polarization in a first direction,
wherein said second polarization is a polarization in a second direction,
wherein said first direction is a vertical direction, and
wherein said second direction is a horizontal direction.

21. A non-transitory computer readable medium embodying machine executable instructions executable to:
operate a first base station, wherein operating the first base station includes:
transmit a first signal at a first average power level from a first antenna having a polarization in a first direction, during a first period of time,
transmit a second signal at a second average power level from a second antenna having a polarization in a second direction, during said first period of time; and
wherein said first and second directions are different by at least 45 degrees;
wherein said second average power level is lower than the first average power level by more than 2 dB; and
wherein the first antenna and the second antenna provide service to a first sector,
wherein an adjacent base station adjacent to the first base station transmits the polarization in the second direction at a higher average power level than the adjacent base station transmits the first polarization in the first direction,
wherein transmitting the first signal and the second signal are performed at the same time.

22. The non-transitory computer readable medium of claim 21, wherein said first direction is a vertical direction and said second direction is a horizontal direction.

23. An apparatus comprising:
a processor configured to:
- transmit a first signal at a first average power level from a first antenna having a polarization in a first direction, during a first period of time,
- transmit a second signal at a second average power level from a second antenna having a polarization in a second direction, during said first period of time; and
- wherein said first and second directions are different by at least 45 degrees; and
- wherein said second average power level is lower than the first average power level by more than 2 dB; and
- wherein the first antenna and the second antenna provide service to a first sector,
- wherein an adjacent base station adjacent to the first base station transmits the polarization in the second direction at a higher average power level than the adjacent base station transmits the first polarization in the first direction,
- wherein transmitting the first signal and the second signal are performed at the same time.

24. The apparatus of claim 23, wherein said first direction is a vertical direction and said second direction is a horizontal direction.

* * * * *